United States Patent
Geiger

(10) Patent No.: US 11,391,003 B2
(45) Date of Patent: Jul. 19, 2022

(54) DEVICE FOR MONITORING WEAR OF A ROLLER FLANGE

(71) Applicant: NEWTL, Hangenbieten (FR)

(72) Inventor: Paul Geiger, Dachstein (FR)

(73) Assignee: NEWTL, Hangenbieten (FR)

( * ) Notice: Subject to any disclaimer, the term of this patent is extended or adjusted under 35 U.S.C. 154(b) by 132 days.

(21) Appl. No.: 16/887,139

(22) Filed: May 29, 2020

(65) Prior Publication Data

US 2020/0399837 A1  Dec. 24, 2020

(30) Foreign Application Priority Data

Jun. 5, 2019  (FR) ..................... 19 05964

(51) Int. Cl.
*G01M 17/10* (2006.01)
*E01B 35/06* (2006.01)
*G01M 5/00* (2006.01)

(52) U.S. Cl.
CPC ........... *E01B 35/06* (2013.01); *G01M 5/0033* (2013.01); *G01M 17/10* (2013.01)

(58) Field of Classification Search
CPC ..... E01B 35/06; G01M 5/0033; G01M 17/10; B60B 17/0082; B60B 17/02; B60B 2900/113; B60B 2900/3316; B60B 17/0068; B61K 9/12; B61B 13/04; G01B 21/00
See application file for complete search history.

(56) References Cited

U.S. PATENT DOCUMENTS

| | | | | |
|---|---|---|---|---|
| 4,069,590 A | * | 1/1978 | Effinger | B61K 9/08 33/1 Q |
| 4,391,134 A | * | 7/1983 | Theurer | E01B 35/00 33/523.2 |
| 4,417,466 A | * | 11/1983 | Panetti | G01B 21/20 73/105 |
| 4,541,182 A | * | 9/1985 | Panetti | E01B 31/12 33/560 |
| 5,704,295 A | * | 1/1998 | Lohr | B62D 1/265 105/72.2 |
| 6,768,551 B2 | * | 7/2004 | Mian | B61K 9/12 250/559.23 |
| 8,141,496 B2 | * | 3/2012 | Andre | B62D 1/265 105/72.2 |
| 8,511,622 B2 | * | 8/2013 | Consoli | B61F 9/00 246/170 |
| 9,132,847 B2 | * | 9/2015 | Andre | B61K 9/00 |

(Continued)

FOREIGN PATENT DOCUMENTS

DE  199 13 127  9/2000

OTHER PUBLICATIONS

International Search Report dated Feb. 5, 2020.

*Primary Examiner* — Freddie Kirkland, III
(74) *Attorney, Agent, or Firm* — Ipsilon USA, LLP

(57) ABSTRACT

A device for monitoring wear of a flange (1) of a roller (2) includes a peripheral rim (3) and intended to cooperate with a homologous flange (1*bis*) of a roller (2*bis*) positioned face-to-face to interact with the head of a rolling rail (4). The device includes at least one first recess localized at the level of a peripheral line of constant radius on the flange (1) configured to be positioned at the level at which the point (7) of separation of the flange (1) relative to its homologue (1*bis*) is the smallest.

9 Claims, 3 Drawing Sheets

(56) References Cited

U.S. PATENT DOCUMENTS

| | | | |
|---|---|---|---|
| 9,555,819 B2* | 1/2017 | Consoli | E01B 25/28 |
| 10,647,336 B2* | 5/2020 | Consoli | B61F 9/00 |
| 2003/0072001 A1 | 4/2003 | Mian et al. | |
| 2010/0065692 A1* | 3/2010 | Andre | B62D 1/265 |
| | | | 246/121 |
| 2012/0126066 A1* | 5/2012 | Consoli | B62D 1/265 |
| | | | 246/170 |
| 2014/0306068 A1 | 10/2014 | Andre | |
| 2016/0167685 A1* | 6/2016 | Consoli | B61L 1/04 |
| | | | 246/170 |
| 2019/0375494 A1 | 12/2019 | Francois | |

* cited by examiner

[Fig.1]
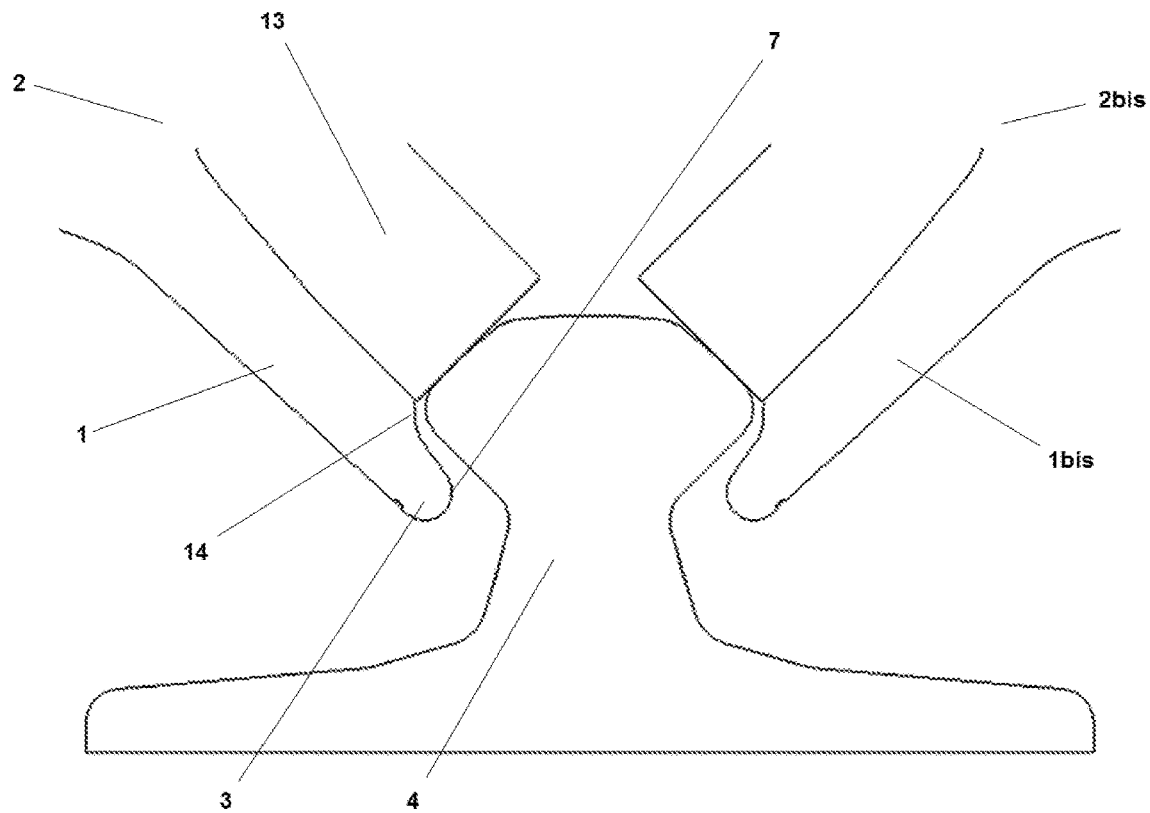
[Fig. 2]
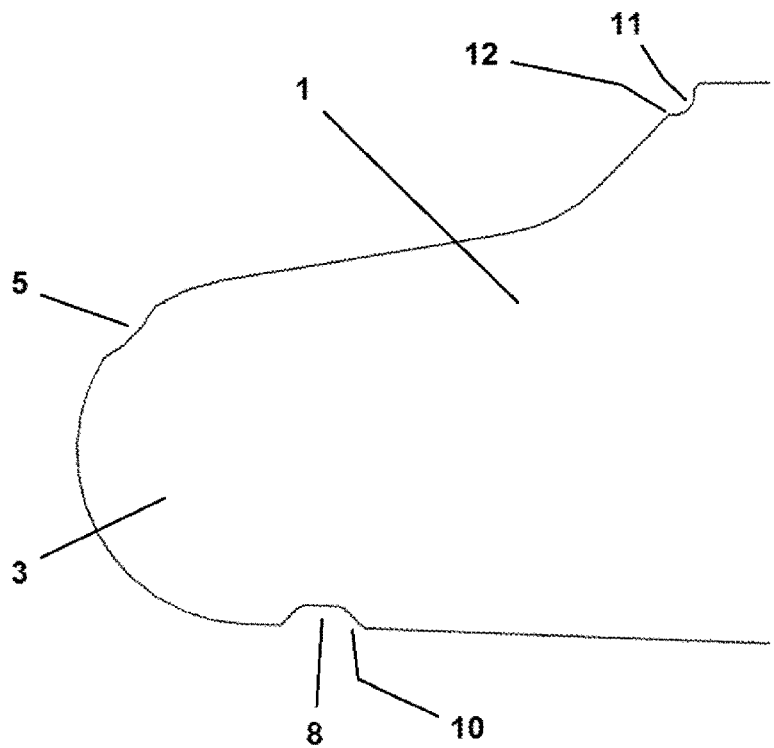

[Fig. 3]
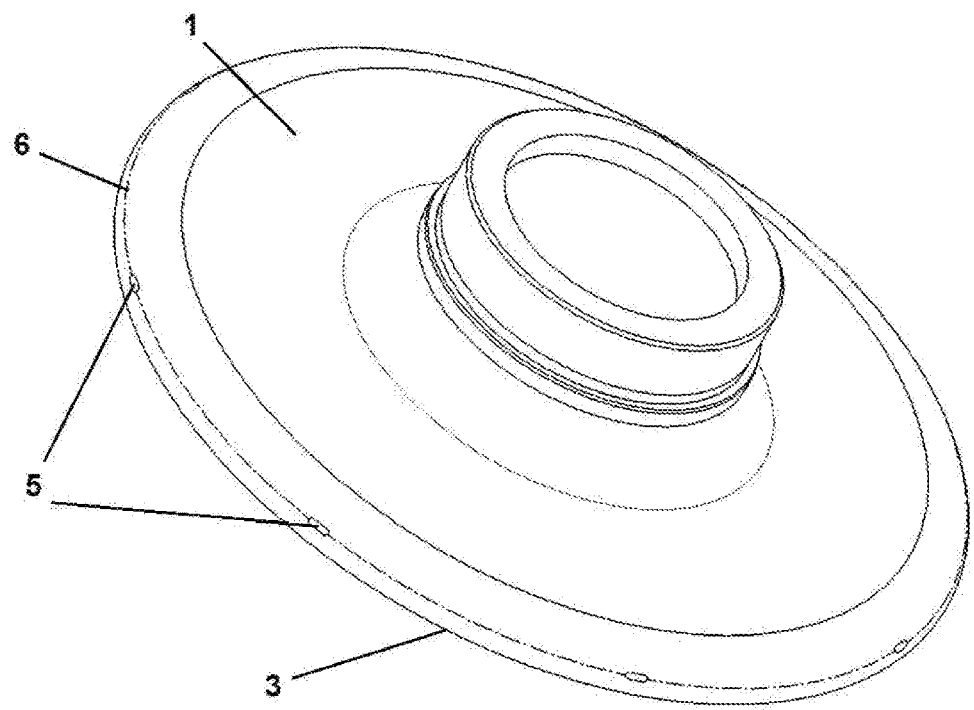
[Fig. 4]
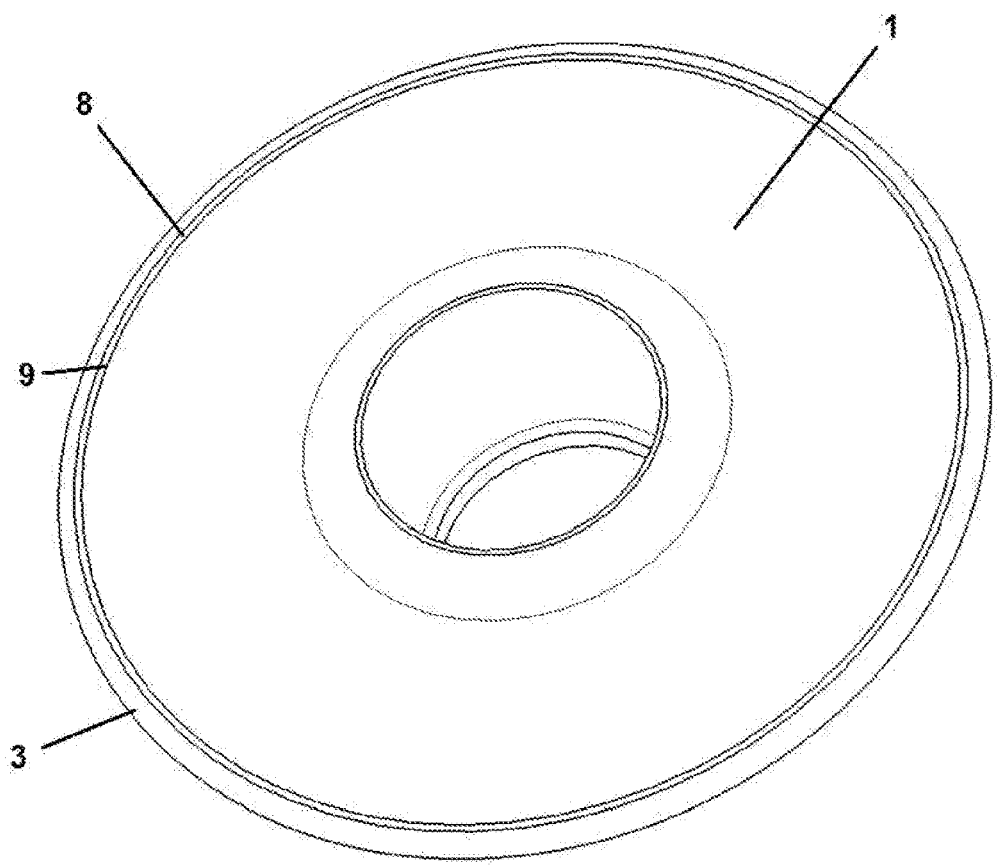

[Fig. 5]
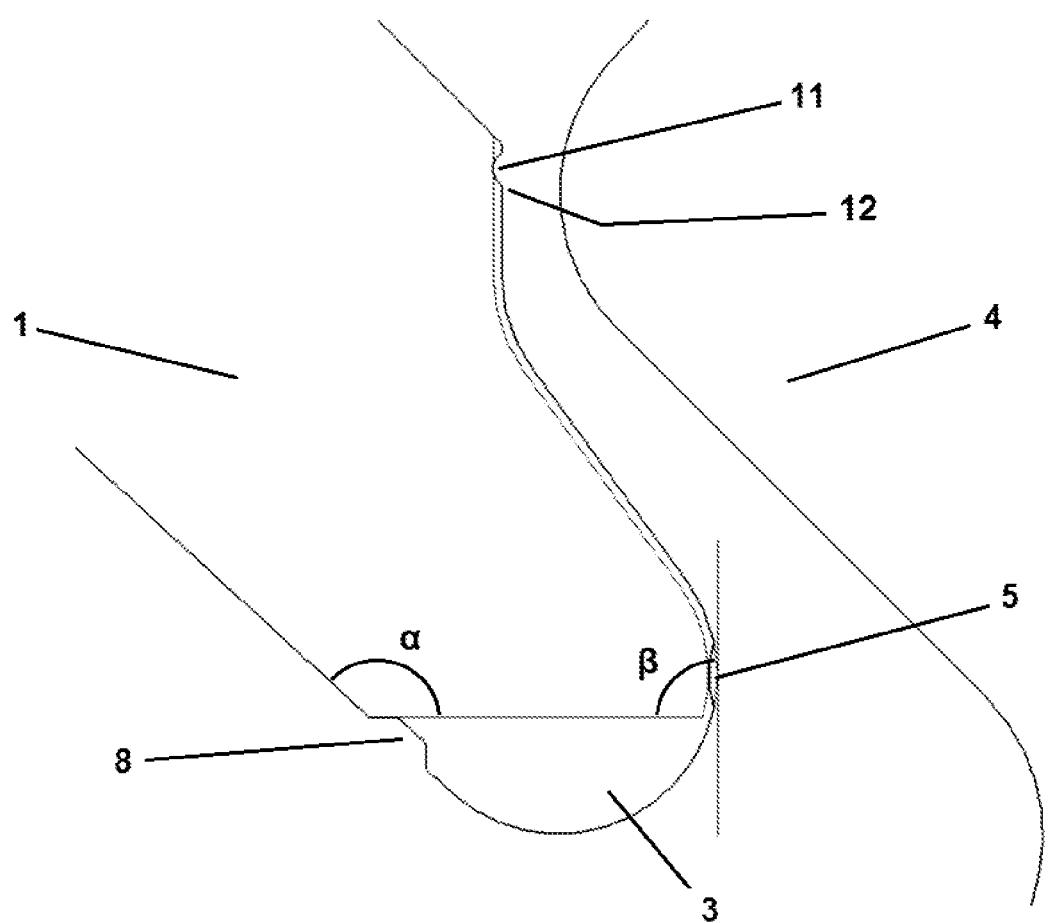

DEVICE FOR MONITORING WEAR OF A ROLLER FLANGE

This application claims the benefit of priority of French Patent Application No. 19 05964, filed on Jun. 5, 2019, the entirety of which is incorporated by reference.

BACKGROUND

Field of the Invention

The present invention relates to the field of devices for monitoring roller flange wear and more particularly to the field of devices for monitoring wear of roller flanges cooperating with a surface of a rail.

Description of the Related Art

During movement of a vehicle rolling along a railway axis, in particular in the context of trams, an existing operating mechanism consists in positioning rollers on either side of a guide rail. These rollers are mounted to rotate about an axis that has an inclination, generally of the order of 45° relative to the vertical, so that, on the one hand, a tyre of each of the rollers bears on each lateral edge of the upper surface of the head of the guide rail and, on the other hand, the upper face of the lowest peripheral portion of the rollers is positioned under the lower portion of the head of the rail. This particular arrangement of the rollers relative to the rail therefore enables guided driving of the vehicle because of the effect of the rotation of the tyres of the roller whilst locking the rail between the rollers because of the particular position of the head of the rail between the tyres above and the flanges below each of the rollers. The positioning of the upper faces of the flanges of the rollers under the head of the rail therefore prevents the rail from being extracted from its position between the two rollers, for example if the vehicle moves upward, and consequently prevents the risk of a loss of guidance of the vehicle.

However, the contact of the flange of a roller with the head of the guide rail if the roller is moved in the heightwise direction, for example because of the effect of an occupied space over which the vehicle could roll, leads to rubbing which, if repeated, leads to natural wear of the peripheral portion of the flanges of the rollers. If the wear of the flange reaches a certain threshold and becomes excessive, the edges of the flanges of the rollers positioned under the rail are then no longer able to hold the vehicle in position relative to the rail and therefore to prevent loss of guidance of the vehicle.

To prevent this kind of phenomenon, it is then indispensable to monitor wear of the flanges of the rollers. To this end, it is standard practice to use a measuring device or a tool intended to be positioned on the flange to measure its dimensions or to check its shape. However, this inspection by means of a tool necessitates the operative to come close to the flange of the inspected roller, or even to manipulate it. The rollers being positioned under the vehicle, this kind of inspection operation then imposes that the approach zone of the rollers be perfectly accessible to the operative responsible for monitoring wear of the flanges and so the vehicle is disengaged from the rail or positioned over a vehicle maintenance trench.

Objects and Summary

An object of the present invention is to alleviate these disadvantages by proposing a device for monitoring wear of a roller flange that allows a rapid inspection operation without imposing any particular working environment constraint.

The invention therefore consists in a device for monitoring wear of a flange of a roller including a peripheral flange and intended to cooperate with a homologous flange of a roller positioned face-to-face to interact with the head of a rolling rail, characterized in that the device includes at least one first recess localized at the level of a peripheral line of constant radius on the flange configured to be positioned at the level at which the point of separation of the flange relative to its homologue is the smallest.

BRIEF DESCRIPTION OF THE DRAWINGS

The invention will be better understood thanks to the following description with reference to preferred embodiments provided by way of nonlimiting example and explained with reference to the appended diagrammatic drawings, in which:

FIG. 1 is a diagrammatic representation of one example of the arrangement relative to a guide rail of flanges incorporating the device of the invention.

FIG. 2 is a diagrammatic representation in section of an example of an arrangement positioning a plurality of recesses on a flange participating in the production of a device according to the invention for monitoring wear.

FIG. 3 is a diagrammatic representation of the view from above of an example of the construction of a flange incorporating the device according to the invention for monitoring wear.

FIG. 4 is a diagrammatic representation of the view from below of an example embodiment incorporating the device according to the invention for monitoring wear.

FIG. 5 is a diagrammatic representation in section of an example of an arrangement positioning a plurality of recesses and showing details of particular technical features of that arrangement.

DETAILED DESCRIPTION

In the present document, because of the inclination of the flange 1 or of the roller 2, references to upper or lower surfaces of the flange 1 or of the roller 2 are relative to the directions in which the surfaces are oriented. Thus a lower surface of the flange 1 is directed toward the ground whereas an upper surface of the flange 1 is directed toward the head of the rail 4. The rim 3 of the flange 1 that produces a peripheral junction between the upper and lower faces of the flange 1 conventionally has a rounded surface so that, because of the inclination of the flange 1 of the roller 2, the surface of the upper portion of the rim 3 is caused to be oriented toward the head whereas the surface of the lower portion of the rim 3 is caused to be directed toward the ground.

The invention relates to a device for monitoring wear of a flange 1 of a roller 2 including a peripheral rim 3 and intended to cooperate with a flange 1bis of a homologous roller 2bis positioned face-to-face to interact with the head of a rolling rail 4, characterized in that the device includes at least one first recess 5 located at the level of a peripheral line 6 of constant radius on the flange 1 configured to be positioned at the level at which the point 7 at which the flange 1 is separated from its homologue 1bis is the smallest. A recess 5 of this kind at the level of the surface of the flange 1 produces a marking that does not degrade the operation of the flange 1 whilst enabling a visual evaluation of wear. In fact, wear of the material at the level of the surface of the flange 1 that surrounds the recess 5 leads to the disappearance of that recess 5. In accordance with one embodiment, because of the inclination of the rotation axis of the roller 2, the peripheral line 6 at constant radius of the flange 1 at the level of which the recess 5 is positioned to be closest to its homologue is disposed on the upper face of the flange 1 of the roller 2 intended to face the rolling rail 4. Thus this peripheral line 6 is more particularly positioned at the level of an upper portion of the rim 3 of the flange 1. The position of the recess 5 on the edge of the flange 1 where the point 7 at which the flange 1 is separated relative to its homologue 1bis is the smallest procures a marking for evaluation of the quantity of material of the flange 1 positioned under the lower face of the head of the rail 4 and therefore of the capacity of the flange 1 to oppose extraction of the rail 4. The recess 5 at the peripheral separation point 7 of the flange 1 therefore provides an element for monitoring the safety of guidance by the rollers 2, 2bis.

In accordance with one particular constructional feature of the peripheral line 6 that positions this first recess 5, the latter is positioned at the level of a point on the upper surface of the rim 3 the tangent to which is oriented along a substantially vertical axis when the roller 2 is mounted on an axle inclined relative to the vertical.

According to a complementary particular constructional feature of the invention, the device for monitoring wear of the flange 1 also includes at least one second recess 8 positioned at the level of a peripheral line 9 of constant radius located on the surface of the flange 1 opposite the surface intended to face the rolling rail 4. This surface of the flange 1 opposite the surface of the flange 1 facing the rail 4 corresponds to the lower surface of the flange 1 and is disposed in a plane substantially perpendicular to the rotation axis of the roller 2. The recess 8 positioned on the lower surface of the flange 1 produces a marking that enables quantization of the wear of the peripheral edge of the flange 1 and in particular of the lower part of the rim 3. Being oriented toward the ground, this lower part of the rim 3 is caused to encounter elements disposed on either side of the rail 4, in particular at the level of its flanges. These occupied space or trash elements, recurrent in an urban environment, are liable to rub against the surface of the rim 3 leading to wear thereof. However, in contrast to wear of the upper face of the rim 3, wear of the lower face of the rim has less impact on the safety of the vehicle. Also, the tolerance to wear at the level of the lower face of the flange 1 is higher than at the level of its upper face. Monitoring wear of the lower face of the flange 1 at the level of the recess 8, by verifying the state of the lower part of the rim 3, enables monitoring of the mechanical capacity of the flange 1 to be retained on the rail 4 by means of this part of the rim 3. The volume of material occupied by the lower part of the rim 3 participates in reinforcing the rigidity of the peripheral edge of the flange 1 on contact against the lower face of the head of the rail 4 during lifting. Similarly, this volume of material imparts inertia to the flange 1 in the event of lifting.

The radius of the peripheral line 6 at the level of which is positioned the first recess 5 situated at the level of the upper face of the flange 1 is made greater than the radius of the peripheral line 9 at the level of which is positioned the second recess 8 at the level of the lower face of the flange 1. Because of the inclination of the rotation axis of the flange 1, this difference in radius of the peripheral lines 6, 9 enables positioning of the peripheral lines 6, 9 situated in the vicinity of the rail 4 at substantially identical heights relative to the ground or to the flange of the rail 4.

According to one specific feature of this particular constructional feature, the second recess 8 includes an inner edge 10 with a slope positioned in a plane at an angle α to the surface of the flange 1 that carries this second recess 8 so that on the one hand the lateral edge of the rim 3 of the flange 1 and on the other hand the first recess 5 are positioned on respective opposite sides of the plane of the slope of the inner edge 10. The inner edge 10 of the second recess 8 corresponds to the edge of the recess 8 positioned axially, that is to say positioned on the side of the pivot axis of the roller 2. According to a preferred construction of this specific feature, the angle α of the slope of the inner edge 10 with respect to the surface of the flange 1 that carries the second recess 8 has a value between 40° and 50° inclusive. The angle of inclination of the axle of the roller 2 relative to the vertical being of the order of 45°, the slope of the inner edge 10 of the second recess 8 is then disposed in a plane that is substantially horizontal or substantially parallel to the plane of the surface of the ground on which the rail rests. Deterioration of the flange 1 through its rim 3 rubbing against elements disposed on the ground leads to progressive wear on a plane substantially parallel to the plane of the surface of the ground. Also, the inner edge 10 of the second recess 8 disposed with a slope substantially parallel to the plane of the surface of the ground enables marking for evaluation of the amplitude of wear of the rim 3 in a particular plane so that the marking formed by the second recess 8 at the level of the lower surface of the flange 1 also enables, from the lower face of the flange 1, evaluation of the magnitude of the wear of the upper portion of the rim 3 relative to the position of the first recess 5 disposed on the upper face of the flange 1. According to a preferred form of construction, the plane of the slope of the inner edge 10 of the second recess 8 is positioned at least 2 millimetres from the lateral edge of the first recess 5 in the upper face of the flange 1. Also, thanks to this arrangement of the plane of the slope of the second recess 8, it is possible for an operative to evaluate from the lower surface of the flange 1 if the wear of the lateral portion of the rim 3 is impacting the upper face of the flange 1 and thus, consequently, the risk of extraction of the rail 4 from its position between the rollers 2.

According to another specific feature complementary to the particular constructional feature referred to above, the tangent at the level of the point at which the first recess 5 is positioned forms an angle β with the plane of the inner edge 10 of the second recess 8 the value of which is between 85° and 95° inclusive. A constructional arrangement of this kind arises in particular when, the roller 2 being mounted on an axle inclined relative to the vertical, the peripheral line 6 that positions the first recess 5 is found to be positioned at the level of a point on the upper surface of the rim 3 the tangent to which is oriented along a substantially vertical axis.

According to a complementary other particular feature of the invention, the device includes an additional recess 11 located at the level of a peripheral line 12 of constant radius at the neck of the flange 1 and positioned at the level of a point 14 on the upper surface of the flange 1 at which the departure of the flange 1 relative to its homologue 1bis is the greatest. This disposition of the peripheral line 12 on the neck of the flange 1 preferably corresponds to the point on the upper surface of the flange 1 positioned facing the lateral edge of the head of the rail 4. This point on the upper surface of the flange 1 is in particular positioned in the vicinity of the tyre 13 of the roller 2 and enables evaluation of the wear of the flange 1 following lateral movements of the vehicle relative to the guide rail such that the flanges 1 successively impact the head of the rail 4 on respective opposite sides thereof. If the upper surface of the flange 1 includes a coating and/or a treatment improving the hardness and/or the wear resistance, the additional recess 11 is positioned at the level of the edge of that surface treatment and/or coating closest to the pivot axis of the flange 1. Similarly, the first recess 5 is positioned at the level of the edge of this surface treatment and/or coating farthest from the pivot axis of the flange 1. Also, if no sharp points or edges appear on the upper surface of the flange 1 after use, the wear of a coating and/or of the treated surface can then be evaluated easily as a function of the disappearance of the recesses 5, 11 strategically positioned at the level of the two edges of the reinforced or treated upper surface of the flange 1.

According to a preferred specific constructional feature of this particular feature, the peripheral line 12 that positions this additional recess 11 on the flange 1 of the roller 2 is found placed at the level of a point on the upper surface of the flange 1 the tangent to which is oriented along a substantially vertical axis when the roller 2 is mounted on an axle inclined relative to the vertical.

According to another complementary specific feature of this particular constructional feature, the additional recess 11 has an outer edge 12 the slope of which is positioned in a plane that forms an angle with the plane of the slope of the inner edge 10 of the second recess 8, the angle having a value between 40° and 50° inclusive. The outer edge 12 of the additional recess 11 corresponds to the edge of the recess 11 positioned radially, that is to say positioned on the side of the rim 3 of the roller 2.

It should be noted that, because the roller 2 pivots in particular about a rotation axis at an angle of inclination relative to the vertical, wear of the flange 1 can be evaluated by the operative from a point of view that does not necessitate access to the zone in which the rail 4 is positioned between the flanges 1, 1*bis*. Also, from a point of view that does not enable them to access the zone in which the rail 4 is positioned between the flanges 1, 1*bis*, an operative is able to cause the roller 2 to pivot to inspect one or more of the recesses 5, 8, 11 for monitoring the wear of the flange 1.

According to another complementary particular constructional feature, at least one recess 5, 8, 11 is produced in the form of a circular groove disposed along a peripheral line 6, 9, 12 of constant radius.

According to an alternative to the preceding particular constructional feature, at least one recess 5, 8, 11 is produced by at least one localized absence of material on a peripheral line 6, 9, 12 of constant radius.

According to another complementary particular constructional feature, the surface of the flange 1 having a coating and/or a treatment improving the hardness and/or the wear resistance, at least one recess 5, 8, 11 is produced so as to have a depth less than the thickness of the surface treatment that covers the monitored portion of the surface of the flange 1. According to one embodiment, this depth of an opening 5, 8, 11 is at most 0.6 millimetre, preferably at most 0.5 millimetre.

Of course, the invention is not limited to the embodiments described and shown in the appended drawing. Modifications remain possible without this departing from the scope of protection of the invention, in particular from the point of view of the constitution of the various elements or through substitution of technical equivalents.

The invention claimed is:

1. A flange of roller coaster comprising:
   a device for monitoring wear of said flange of a roller having a peripheral rim, the flange of a roller being arranged to cooperating with a homologous flange of a roller positioned face-to-face to interact with the head of a rolling rail, said device has
   at least one first recess localized at the level of a peripheral line of constant radius on the flange configured to be positioned at the level at which the point of separation of the flange relative to its homologue is the smallest, the roller of the flange being mounted on an axle inclined relative to vertical, and a peripheral line of constant radius on the flange is positioned at the level of a point on an upper surface of a rim, a tangent to which is oriented along a substantially vertical axis.

2. A device according to claim 1, wherein the device for monitoring wear of the flange also includes at least one second recess positioned at the level of a peripheral line of constant radius and localized on the surface of the flange opposite the surface intended to face the rolling rail.

3. A device according to claim 2, wherein the second recess has an inner edge with a slope positioned in a plane at an angle to the surface of the flange that carries this second recess so that on the one hand the lateral edge of the rim of the flange and on the other hand the first recess are positioned on respective opposite sides of the plane of the slope of the inner edge.

4. A device according to claim 3, wherein the angle of the slope of the inner edge to the surface of the flange that carries the second recess has a value between 40° and 50° inclusive.

5. A device according to claim 3, wherein the tangent at the level of the point at which the first recess is positioned is at angle to the plane of the inner edge of the second recess the value of which is between 85° and 95° inclusive.

6. A device according to claim 1, wherein the device includes an additional recess localized at the level of a line of constant radius peripheral to the neck of the flange and positioned at the level of a point on the upper face of the flange at which the separation of the flange relative to its homologue is the greatest.

7. A device according to claim 1, wherein at least one recess is produced in the form of a circular groove disposed along a peripheral line of constant radius.

8. A device according to claim 1, wherein at least one recess is produced by at least one localized absence of material localized on a peripheral line of constant radius.

9. A device according to claim 1, wherein the surface of the flange having a coating and/or a treatment improving the hardness and/or the resistance to wear, at least one recess is produced so as to have a depth less than the thickness of the surface treatment that covers the monitored portion of the surface of the flange.

* * * * *